(12) United States Patent
Diament et al.

(10) Patent No.: US 9,311,624 B2
(45) Date of Patent: *Apr. 12, 2016

(54) SYSTEM TO VIEW AND MANIPULATE ARTIFACTS AT A TEMPORAL REFERENCE POINT

(75) Inventors: Judah M. Diament, Bergenfield, NJ (US); Jacquelyn A. Martino, Cold Spring, NY (US); John C. Thomas, Jr., Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,015

(22) Filed: Sep. 12, 2012

(65) Prior Publication Data

US 2013/0212473 A1 Aug. 15, 2013

Related U.S. Application Data

(63) Continuation of application No. 13/369,955, filed on Feb. 9, 2012.

(51) Int. Cl.
*G06Q 10/10* (2012.01)

(52) U.S. Cl.
CPC .................. *G06Q 10/101* (2013.01)

(58) Field of Classification Search
CPC ......... G06F 8/68; G06F 8/71; G06F 17/2211; G06F 17/2247; G06F 17/2264; G06F 17/2288; G06F 17/30014; G06F 17/30174; G06F 17/30312; G06F 17/30575; G06F 17/30604; G06F 17/30958; H04L 2209/60
USPC ................... 715/229; 707/695; 717/104–113, 717/120–123
See application file for complete search history.

(56) References Cited

U.S. PATENT DOCUMENTS

| 4,558,413 | A | * | 12/1985 | Schmidt et al. ................ 717/170 |
|---|---|---|---|---|
| 5,392,220 | A | * | 2/1995 | van den Hamer et al. ..... 716/105 |
| 5,581,682 | A | * | 12/1996 | Anderson ............. G06F 17/241 715/236 |
| 5,623,661 | A | * | 4/1997 | Hon |
| 5,850,554 | A | * | 12/1998 | Carver .......................... 717/162 |
| 5,897,636 | A | * | 4/1999 | Kaeser |
| 6,092,091 | A | * | 7/2000 | Sumita .............. G06F 17/30011 707/999.002 |
| 6,195,796 | B1 | * | 2/2001 | Porter .......................... 717/122 |
| 6,385,627 | B1 | * | 5/2002 | Cragun .................. G06Q 10/10 709/201 |
| 6,430,563 | B1 | * | 8/2002 | Fritz et al. ..................... 707/694 |

(Continued)

OTHER PUBLICATIONS

User Manual and Programmers' Reference; 2005; Altova; pp. 1-829.*

(Continued)

*Primary Examiner* — Andrew Dyer
(74) *Attorney, Agent, or Firm* — Scully, Scott, Murphy & Presser, P.C.; Louis J. Percello, Esq.

(57) ABSTRACT

One or more artifact drafts may be associated with each of a plurality of artifacts, each of the artifact drafts representing a state of the associated artifact at a point in time and one or more commands in a command stack that transformed the artifact draft's parent into the artifact draft. Multiple traceability links and traceability vertices represent connections between the artifact drafts of the artifacts. A traceability link includes an edge between an artifact draft of an artifact and an artifact draft of another artifact. A module is operable to navigate through said one or more artifacts of the plurality of artifacts from a reference temporal point via the plurality of traceability links.

18 Claims, 9 Drawing Sheets

(56) References Cited

U.S. PATENT DOCUMENTS

| | | |
|---|---|---|
| 6,904,454 B2 | 6/2005 | Stickler |
| 7,207,034 B2 | 4/2007 | Burke et al. |
| 7,600,225 B2* | 10/2009 | Sliger et al. .................. 717/169 |
| 7,644,111 B2* | 1/2010 | Jaffri et al. ............ 707/999.203 |
| 7,814,367 B1* | 10/2010 | Squibb et al. .................. 714/19 |
| 7,882,148 B2* | 2/2011 | Werner et al. ................ 707/803 |
| 7,945,122 B2 | 5/2011 | Godoy et al. |
| 2002/0042792 A1* | 4/2002 | Nishioka et al. .................. 707/5 |
| 2002/0188638 A1* | 12/2002 | Hamscher .................... 707/530 |
| 2003/0115547 A1* | 6/2003 | Ohwada et al. .............. 715/511 |
| 2004/0088332 A1* | 5/2004 | Lee et al. ...................... 707/200 |
| 2004/0148567 A1* | 7/2004 | Jeon et al. ..................... 715/511 |
| 2005/0256893 A1* | 11/2005 | Perry ............................ 707/101 |
| 2006/0161576 A1 | 7/2006 | Barrs et al. |
| 2006/0253418 A1 | 11/2006 | Charnock et al. |
| 2007/0106520 A1* | 5/2007 | Akkiraju et al. .................. 705/1 |
| 2007/0106982 A1 | 5/2007 | Dalal et al. |
| 2007/0143320 A1* | 6/2007 | Gaurav et al. ................ 707/101 |
| 2007/0203931 A1* | 8/2007 | Ukelson et al. .............. 707/101 |
| 2008/0005194 A1* | 1/2008 | Smolen et al. ................ 707/202 |
| 2008/0034327 A1* | 2/2008 | Cisler et al. .................. 715/854 |
| 2008/0077850 A1* | 3/2008 | Gauthier et al. .............. 715/234 |
| 2008/0172607 A1* | 7/2008 | Baer ............................. 715/255 |
| 2008/0177782 A1* | 7/2008 | Poston et al. ................. 707/102 |
| 2009/0024590 A1* | 1/2009 | Sturge et al. ...................... 707/3 |
| 2009/0031239 A1* | 1/2009 | Coleran et al. ............... 715/771 |
| 2009/0049108 A1* | 2/2009 | Forde et al. ................... 707/203 |
| 2009/0138792 A1 | 5/2009 | Cudich et al. |
| 2009/0248757 A1 | 10/2009 | Havewala et al. |
| 2010/0050188 A1 | 2/2010 | Schellingerhout et al. |
| 2010/0070844 A1* | 3/2010 | Aymeloglu et al. ........... 715/229 |
| 2010/0229149 A1* | 9/2010 | Gella et al. ................... 717/101 |
| 2011/0055286 A1 | 3/2011 | Hailpern et al. |
| 2011/0066619 A1 | 3/2011 | Perantatos et al. |
| 2011/0071975 A1 | 3/2011 | Friedlander et al. |
| 2011/0107246 A1 | 5/2011 | Vik |

OTHER PUBLICATIONS

"The Repository;" CVS—Concurrent Versions System; Aug. 9, 2003; thathost.com; pp. 1-14.*

The Microsoft Office Open XML Formats, Preview for Developers; Jun. 2005; Microsoft Corp.; pp. 1-30.*

International Search Report mailed Apr. 8, 2013 in related International Application No. PCT/US2013/023578.

* cited by examiner

SYSTEM TO VIEW AND MANIPULATE ARTIFACTS AT A TEMPORAL REFERENCE POINT

RELATED APPLICATION

This application is a continuation of U.S. application Ser. No. 13/369,955, filed Feb. 9, 2012, the entire contents of which are incorporated herein by reference.

FIELD

The present application relates generally to computers, and computer applications, and more particularly to manipulating artifacts at a temporal reference point.

BACKGROUND

Knowledge is often captured and fragmented across a set of digital artifacts or files such as text files, images, binaries, source code, proprietary application files, and others. Over the course of capturing or creating such knowledge, implicit relationships between the artifacts in the set are created and/or assumed. To understand or view the state of the knowledge at a given time, one must often examine all or many of the capturing artifacts as they existed at that time.

The types of knowledge and their capturing artifacts may vary widely. Examples include: human understandable knowledge, captured in word processing documents, spread sheets, images, diagrams, and others; executable "knowledge", captured in source code, binaries, configuration files, etc.; distributed transactional knowledge, captured in distributed transaction systems; business process knowledge, captured in the various systems and services composed into the process; process/thread knowledge, captured in the runtimes of a parallel/multi-threaded program.

Systems exist that capture and relate various types of knowledge. Examples of such systems include dependency management systems, version control systems, content management systems. These systems capture artifact state at designated points only, for example, via versions, milestones, commit points; but not the set of actions/changes that transformed an artifact from state N to state N+1. Navigation and relationships between artifacts are organized around and limited to their state at the designated points.

Viewing the state of a set of related artifacts at a given point in time is not possible if a designated point—e.g., versions, milestones, commit points—does not exist for that point in time. In the current state of the art, users are not able to access the state of a set of artifacts as they existed at time Y, and/or create a new state of the artifacts starting from their state at time Y, where Y is not the present and the state at time Y is not captured explicitly by a version, milestone, commit point or another such designated point captured by known methodologies. Such inability presents a limiting factor in collaborative knowledge creation and discovery, debugging of distributed and/or parallel systems, forensic knowledge discovery, and others.

In addition, in the current state of the art, artifacts must be under the control of a single instance/installation of these systems in order to relate them to each other and thus recreate the captured/fragmented knowledge. Relationships between artifacts where one or more exists completely outside the systems' hierarchies can not be captured or navigated.

BRIEF SUMMARY

A system to view and manipulate artifacts at a temporal reference point, in one aspect, may include one or more artifact drafts associated with each of a plurality of artifacts. Each of the artifact drafts may represent a state of the associated artifact at a point in time and one or more commands in a command stack that transformed the artifact draft's parent into the artifact draft. A plurality of traceability links and traceability vertices may represent connections between the artifact drafts. A traceability link may include an edge between an artifact draft of an artifact in the plurality of artifacts and an artifact draft of another artifact in the plurality of artifacts. The artifact draft of an artifact in the plurality of artifacts and the artifact draft of another artifact in the plurality of artifacts may form the traceability vertices. A module may be operable to execute on a processor and navigate through one or more artifacts of the plurality of artifacts from a reference temporal point via the plurality of traceability links.

A method to view and manipulate artifacts at a temporal reference point, in one aspect, may include receiving a command that edits a first artifact. The method may also include adding a time stamp to the command. The method may further include storing the command in a command stack. The method may yet further include storing a current state of the first artifact and the command stack as an artifact draft. The method may still yet include in response to detecting that the command is an action that accesses a second artifact, creating a traceability link between said artifact draft and a second artifact draft associated with said second artifact.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment presents a system and methodology to view and manipulate artifacts in an artifact universe as it existed at a previous point in time. For instance, a user (where a user is a human or an automated system) viewing the state of artifact x as it was at time y can choose to view other artifacts viewed by a user of the system in their states as they were at time y. A user can optionally branch a new path forward for one or more artifacts, where the starting state of a new branch of an artifact is an artifact's state at time y. A user may traverse artifact draft graphs, where artifact drafts are connected by traceability links, such that viewing the state of artifact x enables a user to view all artifacts connected to x in their states as they were at the points in time at which each connection to artifact x was created.

Generally, artifacts refer to components or items used or created in projects or work. Artifacts may be digital artifacts, for instance, components or items in information technology systems such as files, images, binaries, source code, proprietary application files, and others, which may be stored in memory devices and accessible via a computer processor. Thus an artifact universe of interest may be a computational system. The system and methodology of the present application also may apply to computational descriptions of any other type of systems, for example, mechanical or chemical systems, that can be described in terms of states and transitions and mapped to a computational system. The components in those systems may be described or represented as digital artifacts. The system and methodology of the present disclosure provides, inter alia, a temporal undo and/or do mechanisms for digital artifacts.

Figure 1A:
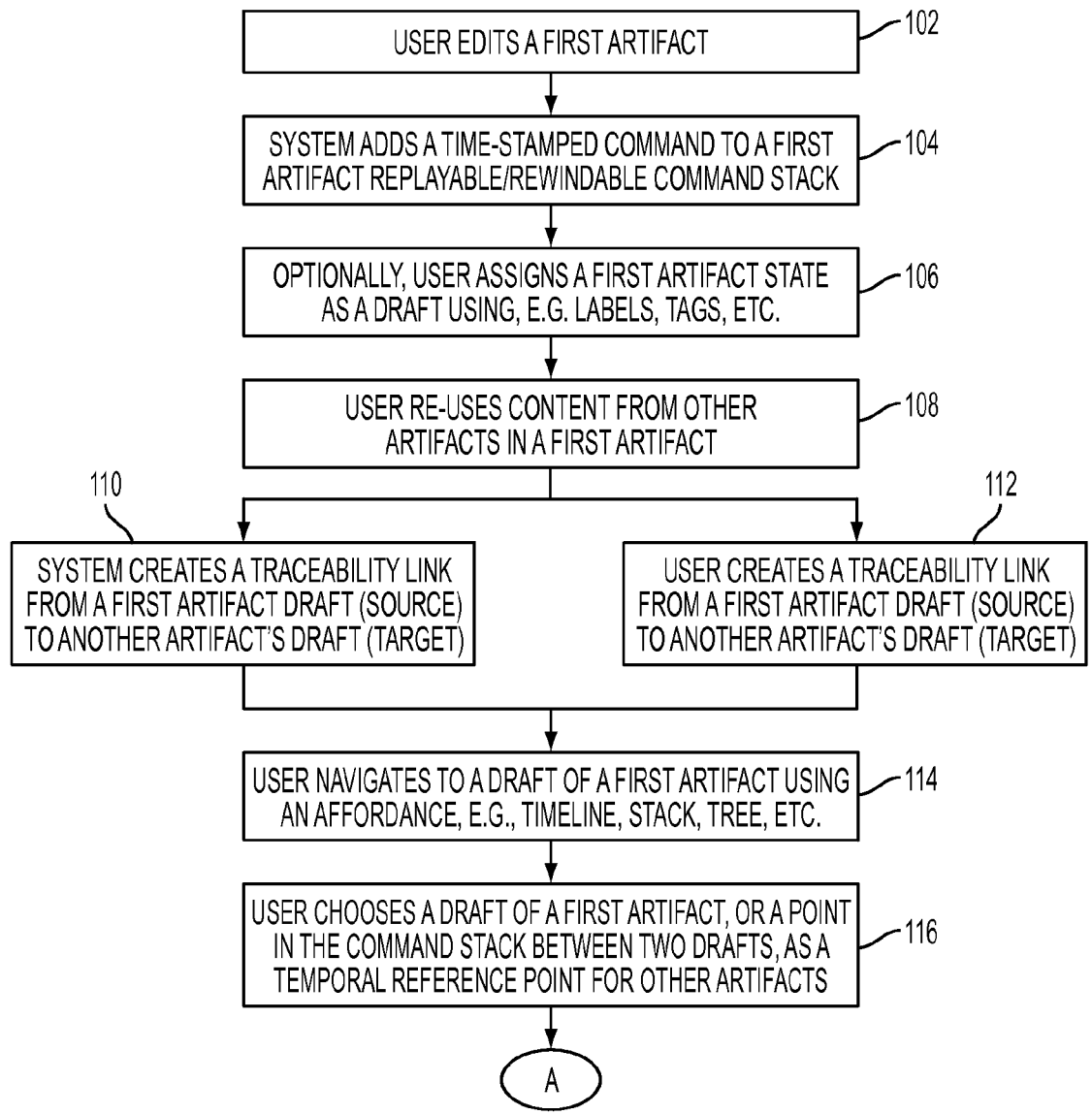
FIGS. 1A-1B illustrate a use case of the system and methodology of the present disclosure in one embodiment.
Figure 1B:
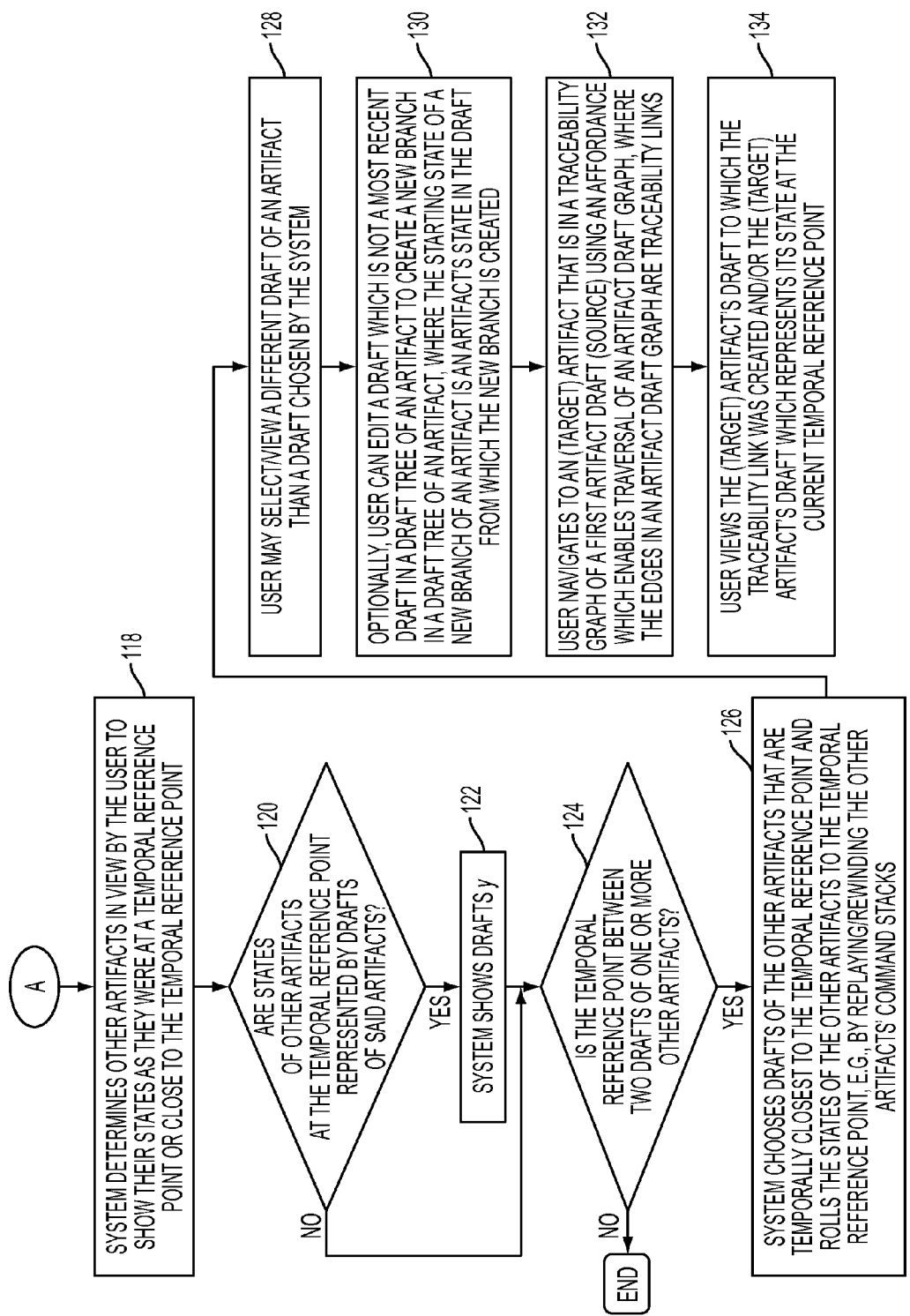

FIGS. 1A-1B illustrate a use case of the system and methodology of the present disclosure in one embodiment. At 102, a user edits a first artifact. At 104, each edit action adds a time-stamped command to a first artifact's replayable/rewindable command stack. The command stack includes one or more commands that changed the artifact. At 106, the user may be given an option to assign a first artifact state as a draft using, e.g., labels, tags, or other elements. Draft refers to a state of an artifact at a point in time and saved as such as designated by a user. For example, a first artifact draft may be created from a first artifact, and a set of commands that transformed the first artifact into the first artifact draft may be saved in a command stack. Subsequent accesses to the first artifact may be to one or more of the first artifact drafts of the first artifact.

At 108, the first artifact is used or reused by other one or more artifacts. The system of the present disclosure in one embodiment detects such use and in response creates a traceability link, for instance, from the first artifact draft (source) to another artifact's draft (target) at 110. In one embodiment, the traceability link is created to the draft that was being viewed, used, accessed, and/or referenced when the link is created. If, for example, the sources and target are open in editors and a cut-and-paste or another similar operation is done, then the open version is the source; if, for example, the first artifact is not being viewed/used in its entirety in an editor or viewer, but instead is, for example, on a list of artifacts in a browser application/viewer or the like which enables users to see what artifacts exist, the source would be whatever draft is selected within said browser. Such a browser may explicitly show a list of all drafts for each artifact, and the user may explicitly pick a draft, or the browser may show a list of artifacts and dictate an assumption, such as "latest draft", "last viewed draft", etc. The system may also automatically detect, with no explicit action per se on the part of the user, the use of another artifact. For example, if a user is typing text into a tool which enables the user to author executable business logic, and the user types the word "customer", where "customer" has been defined in a business ontology, the business logic could be automatically detected as the target and the "customer" entry in the ontology, or the ontology itself, could be detected as the source; in this case, the draft of the ontology currently being employed by the logic authoring tool would be the draft which is designated as the source.

As another example, the system of the present disclosure in one embodiment may detect an access or use of the first artifact from the one or more artifacts. An example may be a spreadsheet application program copying data to an electronic spreadsheet document from an electronic word processing application document. In this example, a traceability link is created between an artifact draft associated with the spreadsheet application program document and an artifact draft associated with the word processing application document. At 112, traceability links between the first artifact draft (source) and the second artifact draft (target) may be also created directly by a user.

At 114, for instance, at some later point in time after one or more of the artifacts have been edited/changed since the point in time at which the traceability link was created, a user navigates to a draft of a first artifact using an affordance, e.g. timeline, stack, tree, etc. Affordances refer to means by which users carry out various actions. Affordances in the present disclosure in one embodiment may include, but are not limited to, an application program interface (API), which is a programmatic means, used by interactive tools as well as automated systems, to access and/or manipulate artifact drafts; Artifact Viewer, a program or module to display an artifact draft's state such that it can be perceived by a user; Editor, a program or module by which the state of an artifact may be altered, and thereby create commands and/or artifact drafts; Navigation tool, a utility such as a time line, data tree, and/or other for etc. to reach and/or select an artifact draft or a point in a draft's command stack between two drafts, thus selecting it as a temporal reference point, reach a traceability vertex via a traceability link. Traceability vertex refers to an artifact or artifact draft that has a traceability link.

At 116, for instance, at some later point in time, a user chooses a draft of a first artifact, or a point in the command stack between two drafts, as a temporal reference point for other artifacts. Temporal reference point refers to a point in time selected by a user such that any artifact opened, edited, and/or accessed by the user will be presented as it was at that point in time. That state in one embodiment of the present disclosure is captured either by an artifact draft that was created at that referenced time or by playing/rewinding an artifact's command stack on a draft that is temporally close to the referenced time in order to reach the artifact's state at the referenced time.

At 118, the system of the present disclosure determines other artifacts being viewed by the user, or are heretofore viewed by the user, for example, to show those other artifacts in their states as they were at the temporal reference point or as they were close to the temporal reference point.

At 120, it is determined whether the states of one or more other artifacts currently being viewed and/or otherwise manipulated by the user of the system are represented at the temporal reference point by drafts of said other artifacts (e.g., draft y), and if so, the system of the present disclosure in one embodiment shows said drafts (y) at 122. This may be done by traversing the traceability link associated with the selected draft indicating the temporal reference point and finding a target vertex of the traceability link. The target vertex would be said one or more other artifacts.

At 124, it is determined whether the temporal reference point is between two drafts of one or more other artifacts, and if so, the system of the present disclosure in one embodiment selects drafts of the other artifacts that are temporally closest to the temporal reference point and rolls the states of the other artifacts to the temporal reference point, e.g., by replaying/rewinding the other artifacts' command stacks at 126. The temporal reference point would be between two drafts if the point in time selected as the reference point is after the timestamp of a draft of the other artifact but before the timestamp of the subsequent draft of the other artifact and there exists commands in the command stack between the two drafts. In one embodiment of the present disclosure, steps 124 and 126 are performed if there is no draft of another artifact at the reference point. In the case where there is no draft of another artifact at the temporal reference point, several different steps may be taken as described below.

If the temporal reference point is earlier than the very first draft of the other artifact, one or more of the following may be done: display nothing for the other artifact and inform the user that the other artifact did not exist at that time; display the earliest draft of the other artifact but warn the user that it is not from the same time as the reference point and prominently display the time its draft is from; continue to display the draft of the other artifact that was previously being shown, and inform the user that artifact did not yet exist at the temporal reference time.

If the temporal reference point is later than the time stamp of the latest draft of another artifact, the method of the present disclosure in one embodiment may display the latest draft of the other artifact, as it is the current draft for that point in time.

For the case in which the reference point is between two drafts of the other artifact, consider the following series of commands and drafts of an artifact, where each has a time stamp: DRAFT 1, c1, c2, c2, c4, DRAFT 2, c5, c6, c7, c8, c9, c10, c11, c12, c13, DRAFT 3. While the exact definition of "closest" will vary depending on the nature of the commands, since one can imagine some commands being much more time consuming and/or expensive than others in some other dimensions besides time (cost of implementing, complexity, etc.), assume for the purposes of this example a simplistic world where the time and cost of all commands is the same (in a real implementation, not all commands will be equals and the definition of "close" may be application-specific). Assume that the reference point is between c7 and c8. Since c7 is 3 commands from DRAFT 2, and c8 is 6 commands from DRAFT 3, one could start with DRAFT 2 and then execute commands c5, c6, and c7 to get to a state that may be considered "closest" to the reference point and display that state.

The system of the present disclosure in one embodiment includes an affordance, which enables a user to select and/or view a different draft of an artifact than a draft chosen by the system, for example, at 128. The methodologies of the present disclosure in one embodiment enables users to understand, and control, how artifacts evolve over time, both independently and in relation to each other. Consider an example in which the user selects draft X of artifact 1 as the temporal reference point, and that has a link to draft Y of artifact 2, so the system displays draft Y. At that point the user might want to, for example, look at draft Y−1 and/or draft Y+1 of artifact 2 to better understand its evolution before and after the traceability link was created. The user can do that using, for example, a timeline widget that allows for navigation between the different drafts of artifact 2.

At 130, the user is given an option to edit a draft which is not a most recent draft in a draft tree of an artifact to create a new branch in a draft tree of an artifact, where the starting state of a new branch of an artifact is an artifact's state in the draft from which the new branch is created.

At 132, the user may be enabled to navigate to an (target) artifact that is in a traceability graph of a first artifact draft (source) using an affordance which enables traversal of an artifact draft graph, where the edges in an artifact draft graph are traceability links.

At 134, the user may view the (target) artifact's draft to which the traceability link was created and/or the (target) artifact's draft which represents its state at the current temporal reference point.

In FIGS. 1A-1B, steps 102, 104 and 106 show an example of how an artifact draft and a command stack may be created. Steps 108, 110 and 112 show an example of how a traceability link may be created among different artifacts or artifact drafts. Step 114 shows how a user may view a draft and associated command stack. Steps 116, 118, 120, 122, 124, 126 and 128 show examples of how other drafts that are linked to a selected draft may be viewed at a user selectable temporal reference point or close to that temporal reference point. Step 130 shows an example of how a user may view and edit a draft and create a new branch in as draft tree. Steps 132 and 134 show how a user may navigate through different drafts based on traceability links. It should be understood that those steps need not performed all at once together or sequentially in that order as shown.

Figure 2:
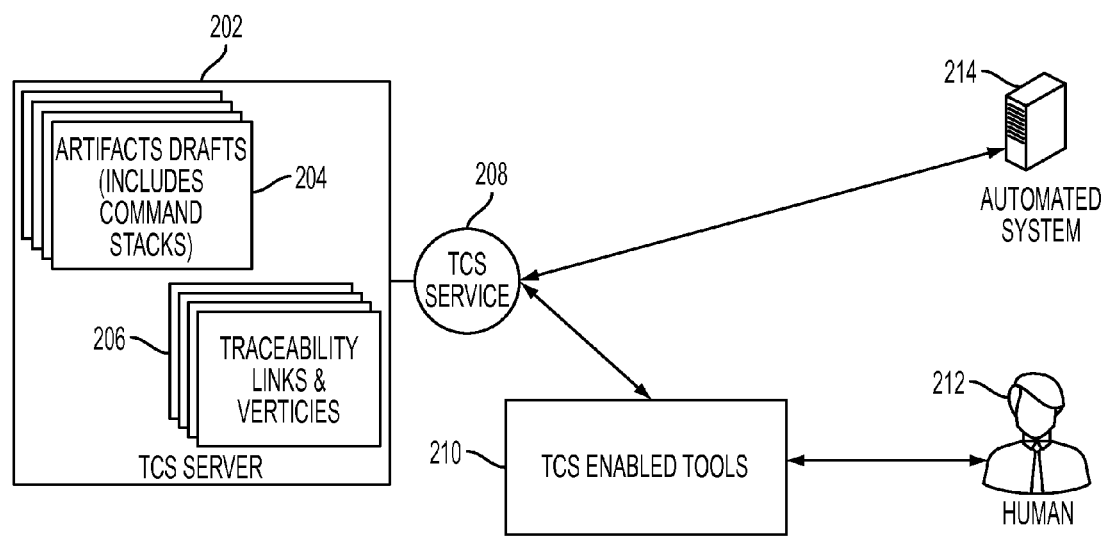
FIG. 2 is a system diagram illustrating components of the system of the present disclosure in one embodiment.

The system of the present disclosure may be also referred to as "Temporal Control System", or TCS. FIG. 2 is a system diagram illustrating components of the system of the present disclosure in one embodiment. TCS Server 202 may include persistent store (storage device) for digital artifact drafts 204 and traceability links and vertices 206, and provides TCS service 208 for creating, accessing, and managing digital artifact drafts (including commands) 204 and traceability links 206.

An artifact draft refers to the state of an artifact at a point-in-time. A command stack includes one or more commands that were issued since the initial creation of this draft to transform its initial content/state to its current content/state. Drafts may be designated as "complete" or "editable". For instance, drafts may be editable until either the user explicitly seals them or the system seals them to maintain the logical integrity of the artifact universe. For example, if more than one child drafts have been created from this draft, the system may want to seal the draft instead of allowing its further editing which will trigger a complicated ripple effect in the artifact's draft tree, which may cause an inconsistent state of the tree. A complete draft is one which may no longer be edited. One can, however, create a new child draft based on it. An editable version of a draft holds a present state of an artifact as well as the command stack that transformed the state of the draft's parent into the state captured by the editable draft. When a draft is "sealed", it is changed from "editable" to "complete". In one embodiment of the present disclosure, once a child draft is created from a complete draft, the complete draft cannot be reverted to being editable without the deletion, or disconnection, of the child drafts.

More than one artifact draft may be created and maintained associated with one artifact. These multiple drafts may be conceptually similar to having multiple branches of code in a version control system. A given draft in the database/persistent store is uniquely identified via its draft identifier (ID), which is unique. The artifact, of which it is a draft, also has a unique ID, and that artifact unique ID is stored together with the draft. Thus, in one embodiment of the present disclosure an artifact and associated drafts may be recorded according to their unique IDs, for instance, by which all related queries may be performed.

Traceability Link 206 represents a content producer-consumer relationship between two artifacts. This relationship can be reified by a one time action, such as a cut-and-paste, a periodic action such as the firing/handling of events, or a continuous action such as the supply/consumption of energy. Traceability link represents a definitive link between two artifacts. The sources and targets of those traceability links may be specific drafts (at specific temporal point) of specific artifacts. Traceability Vertex 206 is a producer or consumer at the end of a traceability link. A vertex identifies an artifact draft, and may also identify an offset into the command stack of the identified artifact.

User in the present disclosure may be one or more human or automated systems viewing and/or accessing and/or manipulating artifacts. TCS service 208 may include one or more application programs and interfaces that allow a user 212 or an automated system 214 such as another computer program or system to create, access and manage the artifact drafts 204 and traceability links 206.

Affordances refer to modules or programs or the like by which users carry out various actions. Affordances may include, but are not limited to:

TCS API: a programmatic means, used by interactive tools as well as automated systems, to access and/or manipulate artifact drafts.

Artifact Viewer: a means to display an artifact draft's state such that it can be perceived by a human. The artifact draft displayed by a viewer may be determined by the selection made in another affordance, where the other affordance is determining the temporal reference point.

Editor: a means by which a user alters the state of an artifact and thereby creates commands and/or artifact drafts.

Navigation: a means, such as a time line, tree, etc. to, e.g.:
Reach and/or select an artifact draft or a point in a draft's command stack between two drafts.
Select a temporal reference point.
Reach a traceability vertex via a traceability link.

TCS Tools and/or TCS enabled tools may include multiple affordances grouped into a single user interface, e.g., a tool to be used by users to interact with the TCS server 202 and/or TCS service 208. For example, TCS enabled tools 210 may be text editors, graphics editors, other programs that include TCS functionality, e.g., as a plugin, that allow interfacing with the TCS service 208 and/or TCS server 202. For example, a TCS-enable text editor or word processing application may automatically determine that a TCS artifact is being edited and create one or more commands for a command stack associated with the artifact and present an option to assign the artifact as an artifact draft.

Figure 3:
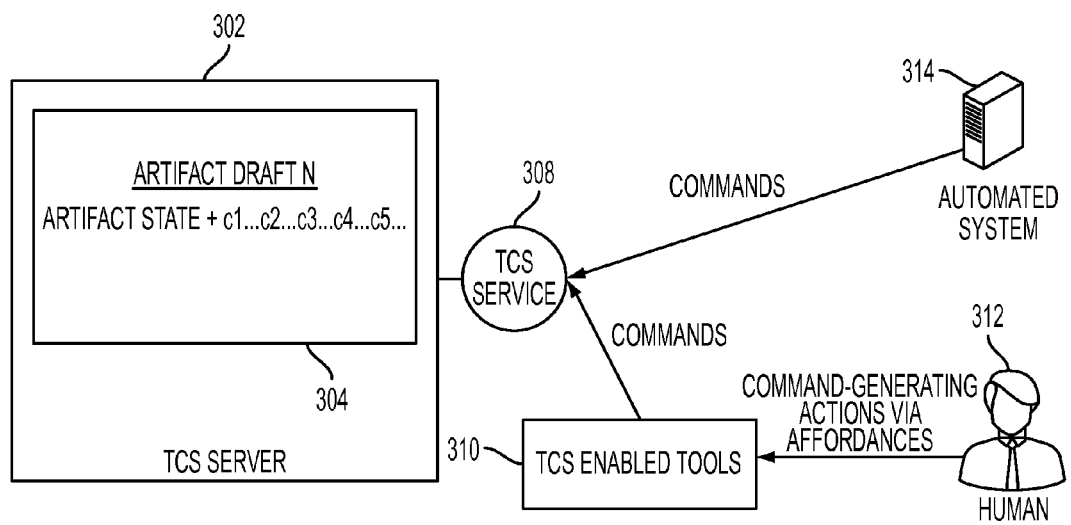
FIG. 3 illustrates an example of sending commands to TCS in one embodiment of the present disclosure.

FIG. 3 illustrates an example of sending commands to TCS in one embodiment of the present disclosure. An automated system 314 may send commands to a TCS service 308 that modifies or changes an artifact. Likewise, a user manually may perform command-generating actions, e.g., using affordances, on TCS enabled tools 310 for making changes to an artifact. TCS enabled tools may transform the command-generating actions into commands which are sent to TCS service 208 to make the changes to the artifact. The changed artifact may be saved or stored as an artifact draft 304 and include the commands (e.g., c1, c2, c3, c4, c5, . . . ) which were applied to transform the draft's initial state into its current state.

Figure 4:
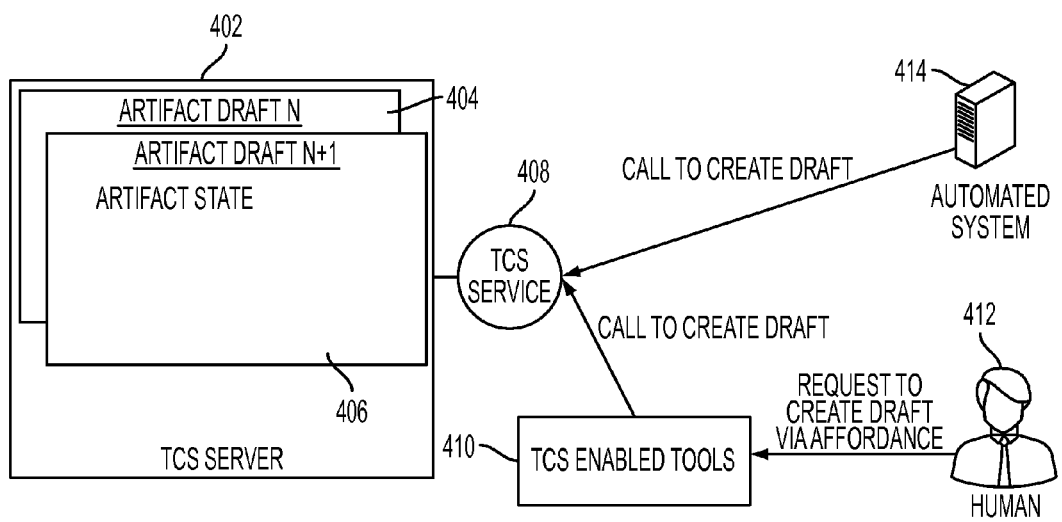
FIG. 4 illustrates an example of creating an artifact draft in one embodiment of the present disclosure.

FIG. 4 illustrates an example of creating an artifact draft in one embodiment of the present disclosure. An automated system 414 may send a call to create a draft of an artifact to a TCS service 408. Likewise, a user manually may request to create a draft, e.g., using affordances, on TCS enabled tools 410. TCS enabled tools 410 send a call to create a draft to the TCS service 408. The TCS service 408 and the TCS server 402 creates an artifact draft based on the call. The call may include inputs such as an artifact identifier and a draft identifier. The created artifact may be stored in the TCS server 402 in one embodiment of the present disclosure.

Different artifact drafts 404, 406 may be created that include different sets of commands that were applied to the previous artifact state. In this way branches of artifact drafts may be created. As an example, consider a company with offices across the country that has a two-tier annual vacation policy: every employee gets a total of 15 paid holidays plus 5 additional vacation days for every 5 years they have worked at the company. For those 15 paid holidays, 7 of them are set for the entire country, and the 8 remaining days are under the control of each regional manager to either assign fixed days when all employees have off or allow the employees to use those 8 days as they see fit. The nationwide vacation policy document can be the initial artifact that outlines the policy described above. For each region in the country, the regional manager creates a regional child draft which adds more information, specifying how the 8 days under regional control will be allocated. This regional policy can change from year to year, and thus the child drafts can change over time.

Figure 5:
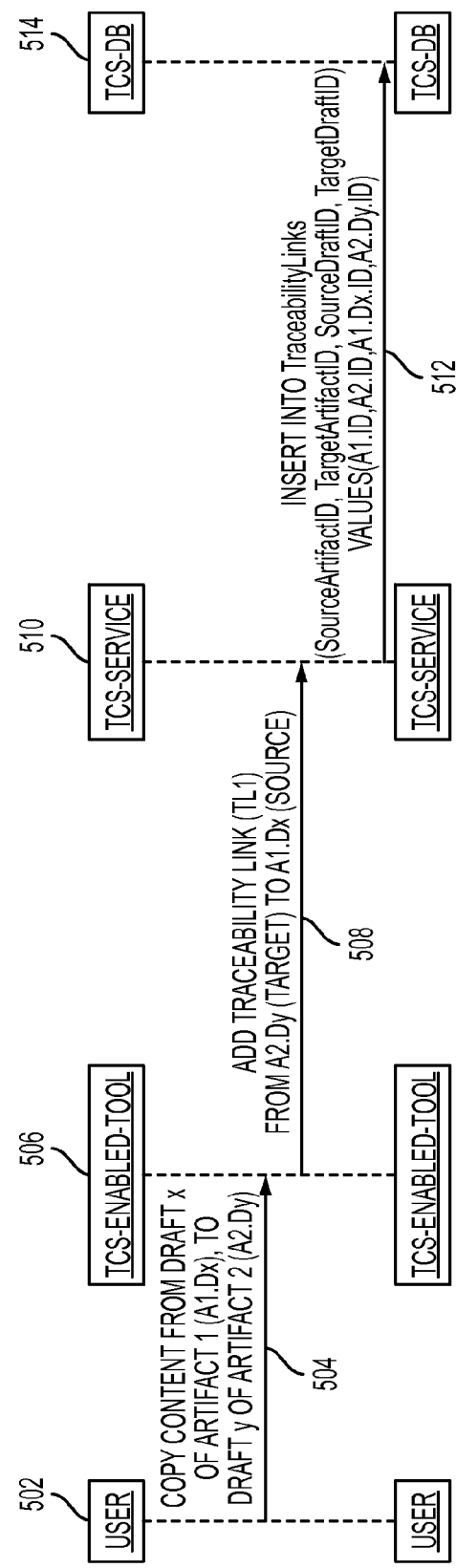
FIG. 5 illustrates an example sequence flow for creating a traceability link in one embodiment of the present disclosure.

FIG. 5 illustrates an example sequence flow for creating a traceability link, for instance, as referred to at item 108 in FIG. 1. A user 502 may copy content from draft x of artifact 1 (A1.Dx), to draft y of artifact 2 (A2.Dy) 504, using a TCS enabled tool 506. TCS-Enabled-Tool 506 may notify TCS-Service 510, the addition of traceability link (TL1) from A2.Dy (target) to A1.Dx (source) at 508. TCS-Service 510 inserts the traceability link into a database 514, e.g., referred to in FIG. 5 as TCS-DB. The traceability link may include values for SourceArtifactID, TargetArtifactID, SourceDraftID, TargetDraftID, e.g., A1.ID,A2.ID,A1.Dx.ID, A2.Dy.ID as shown. The database (e.g., TCS-DB) may serve as the persistent store for the TCS-Server and provides query capabilities across the data stored within it.

Figure 6A:
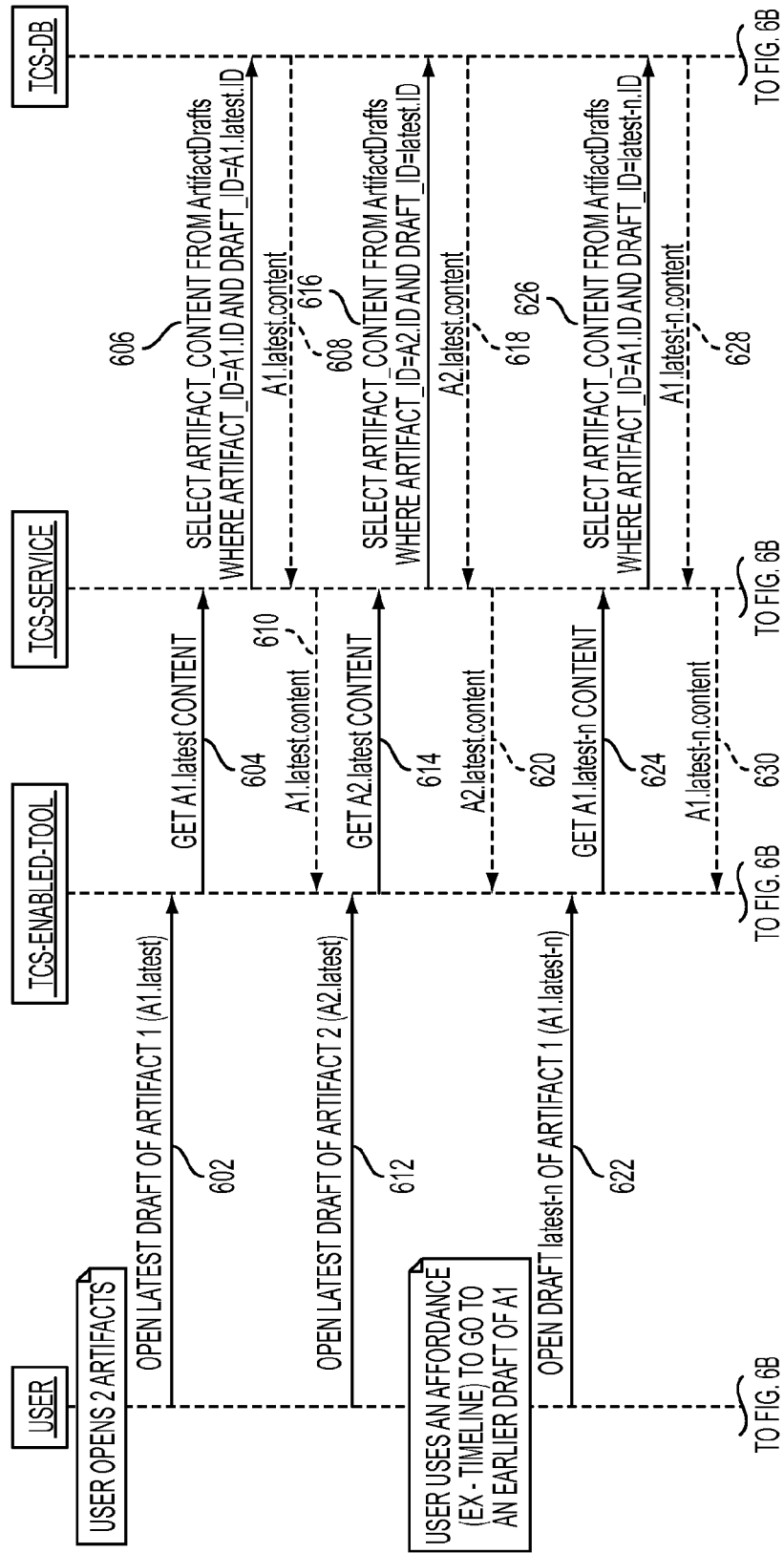
FIGS. 6A and 6B illustrate an example sequence flow illustrating a scenario in which a user may view the states of different artifacts in one embodiment of the present disclosure.
Figure 6B:
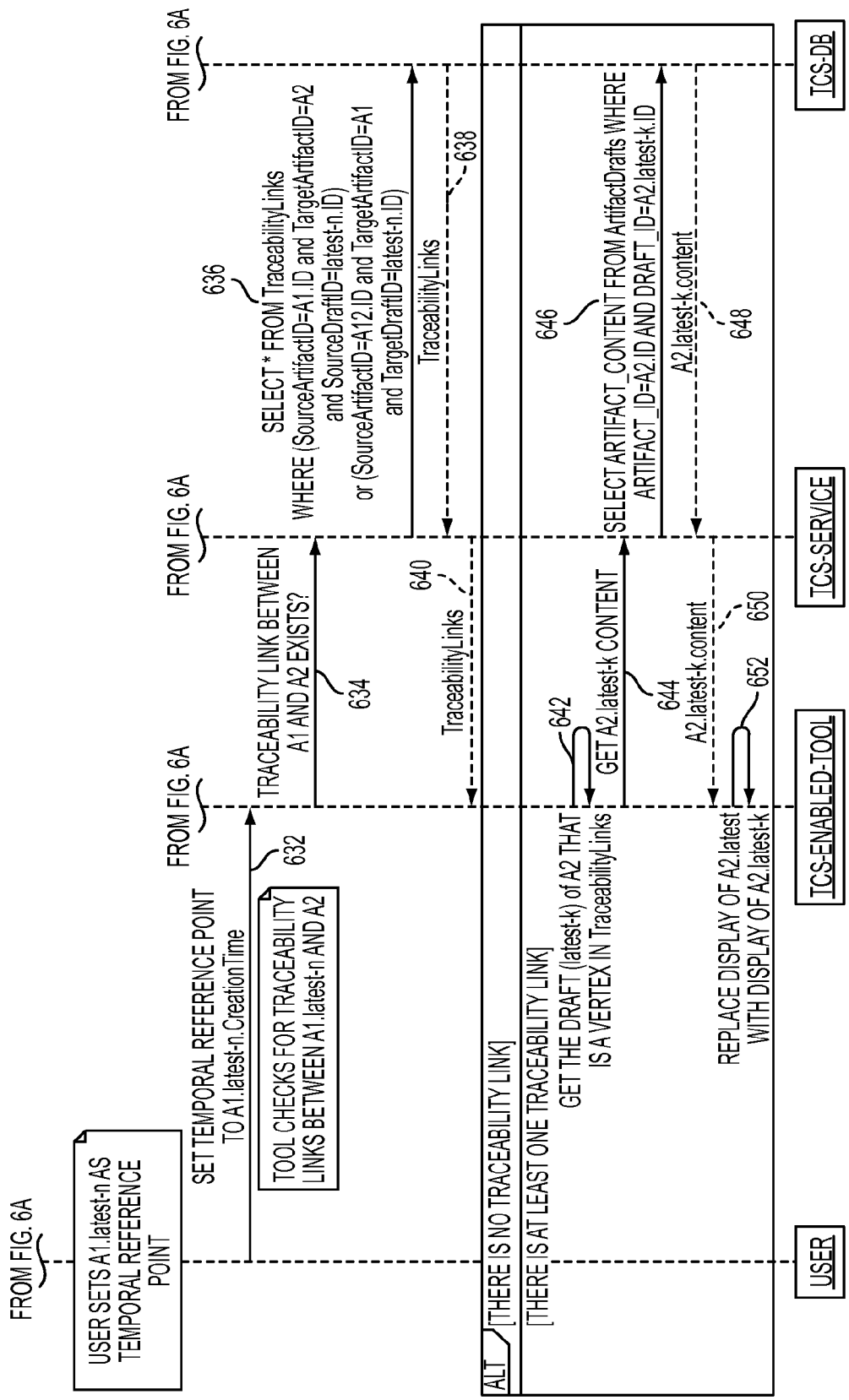

FIGS. 6A and 6B illustrate an example sequence flow illustrating a scenario in which a user may view the states of different artifacts. The sequence flow shows opening two artifacts that have a traceability link between them, selecting an earlier draft of one as the temporal reference point, and opening the corresponding draft of the other artifact. The user may open the latest draft of artifact 1 at 602 via a TCS-Enabled-Tool, which triggers the TCS-Enabled-Tool at 604 to get A1.latest content from a TCS-Service. The TCS-Service in response retrieves A1.latest content from a database, e.g., TCS-DB at 606, for instance, by query (e.g., SELECT ARTIFACT_CONTENT FROM ArtifactDrafts WHERE ARTIFACT_ID=A1.ID AND DRAFT_ID=A1.latest.ID). TCS-DB returns the queried content to TCS-Service at 608. TCS-Service returns the content to TCS-Enabled-Tool at 610. Similarly, the user opening the latest draft of artifact 2 at 612 triggers the TCS-Enabled-Tool to get the latest draft of artifact 2 (A2.latest) from TCS-Service at 614, which in turn retrieves the content from the database at 616, for example, by a query (e.g., SELECT ARTIFACT_CONTENT FROM ArtifactDrafts WHERE ARTIFACT_ID=A2.ID AND DRAFT_ID=latest.ID). TCS-DB returns A2.latest.content to TCS-Service at 618, which returns the content to TCS-Enabled-Tool at 620.

A user may use an affordance (e.g., a timeline graphically presented to the user) to go to an earlier draft of artifact 1 (A1), which for example triggers opening that earlier draft, A1.latest-n (draft latest-n of artifact 1) at 622. TCS-Enabled-Tool at 624 retrieves from TCS-Service, the content of that draft, A1.latest-n content. At 626, TCS-Service gets the content from a database, e.g., TCS-DB, e.g., by a query (e.g., SELECT ARTIFACT_CONTENT FROM ArtifactDrafts WHERE ARTIFACT_ID=A1.ID AND DRAFT_ID=latest-n.ID). At 628, TCS-DB returns A1.latest-n.content to TCS-Service. At 630, TCS-Service returns A1.latest-n.content to TCS-Enabled-Tool.

A user may set A1.latest-n as temporal reference point. At 632, a user sets temporal reference point to A1.latest-n.CreationTime. TCS-Enabled-Tool may check for traceability links between A1.latest-n and A2 at 634 via TCS-Service. TCS-Service at 636 queries TCS-DB to retrieve drafts of other artifacts linked at this temporal reference point. An example query may be "SELECT*FROM TraceabilityLinks WHERE (SourceArtifactID=A1.ID and TargetArtifactID=A2 and SourceDraftID=latest-n.ID) or (SourceArtifactID=A12.ID and TargetArtifactID=A1 and TargetDraftID=latest-n.ID)." As a result, other drafts that are linked to the user selected temporal reference point are returned at 638 to TCS-Service and then at 640 to TCS-Enabled-Tool. The user employing the tool may then access and/or view other drafts that are linked to the user selected temporal reference point.

At 640, the tool has received a list of traceability links between A1 and A2. The diagram shows a choice box ("alt", i.e. alternatives). The first choice—"there is no traceability link"—means there is no link between A1 and A2. In this case, the user may be notified that there are no corresponding drafts, and the sequence ends. The second choice—"there is at least one traceability link"—means there is a link between A1 and A2, so the tool goes through steps 642-652 to display the draft of A2 (A2.latest-k) which corresponds to the temporal reference point (i.e., A1.latest-n.CreationTime) selected by the user. Note that the values of "k" in A2.latest-k and "n" in A1.latest-n do not have to be equal; it is, for example, that A2 has had 7 drafts (k=7) since the temporal reference point while A1 has had 15 drafts (n=15).

By selecting a temporal reference point from the perspective of one artifact, a user may view another artifact's state at the same or substantially same point in time. As discussed above, the methodology of the present disclosure may identify said another artifact's state based on, for example, different combinations of scenarios. Consider, for example, that the two artifacts are A and B, and there is a traceability link with B as the source and A as the target. The following different algorithms may be employed based the scenario in finding the vertices for the link:

- A user selects a draft of A as the reference point, and that corresponds to a draft of B. In this scenario no command stack play/rewind is needed for B.
- A user selects a draft of A as the reference point, and that does not correspond to a draft of B. In this scenario, command stack play/rewind may be needed for B.
- A user selects a point in between two drafts of A, somewhere in a command stack between two drafts in A's history, and that corresponds to a draft of B. In this scenario, no command stack play/rewind is needed for B.
- A user selects a point in between two drafts of A, somewhere in a command stack between two drafts in A's history, and that does not correspond to a draft of B. In this scenario, command stack play/rewind may be needed for B.

As an example usage scenario for the system and/or methodology of the present disclosure, consider an example corporation (Corp A). Corp A is a large multi-national corporation with subsidiaries in all aspects of digital media—a music label, compact disk (CD) production and distribution, digital music sales, mobile news apps, electronics, home entertainment systems, etc. Corp A has a data warehouse which brings together data on its customers from all subsidiaries. Corp A uses this data for sales and marketing across its different products lines. As part of its e-commerce infrastructure, Corp A has an Opportunity Identifier Service (OIS), which uses a combination of business rules and predictive analytics to crunch the information in Corp A's data warehouse to identify up-sale/cross-sale opportunities when a customer visits its web site.

Corp A's development process for operational decisions, such as those captured in OK works as follows:
- The business owner states requirements in text prose;
- A business analyst works with the business owner to create a Decision Model which captures the business logic, including business vocabulary, rules, required data, and usage of analytics;
- IT connects implementation artifacts to each aspect of the Decision Model (executable rules, analytic models, operational data, etc.);
- The decision is deployed.

As an example, consider an OIS team lead (Person A) that works with Person B who is part of Corp A's distribution team to add a rootkit to every CD and mobile application that Corp A sells. The rootkit is used to gather more information about what web sites customers frequent in order to improve the quality of OIS's opportunity identification on the Corp A's website. A document containing business level text prose is written to describe what new information will be captured in the OIS database from the data gathered by the rootkit, and a description of how the data should be used to identify opportunities.

In the system of the present disclosure, the document is a new artifact created/edited in a TCS-enabled text editor. Each time a user adds, deletes, or edits a word, that action is sent by the editor to TCS as a command to be added to the command stack of the current draft of this document in TCS. In one embodiment of the present disclosure, pasting into a document being edited in the TCS-enabled text editor creates a traceability link with the document as the consumer and the link pointing to the offset+length in the text where the paste occurred. Copying from the document creates a traceability link with the document as the producer and the link pointing to the offset+length that was copied. TCS-enabled editors communicate with TCS to jointly create the traceability link in one embodiment of the present disclosure. Each different type of TCS enabled client, be it an editor, a build system, or another, may determine on its own what constitutes a command and what constitutes a new draft.

Next, the OIS Decision Model is edited to add various elements to the model. The editing of the model triggers in the system of the present disclosure to add commands to the command stack of the current draft of the Decision Model in TCS. For example, definitions may be added to the vocabulary associated with the model. Each edit of the vocabulary is sent to TCS as a command in the command stack of the current draft of the vocabulary. Once the new vocabulary terms are added the user may want to designate this as a new draft of the vocabulary. The OIS Decision Model may be also edited to add new sub-decisions containing business rules that use these terms when referencing rootkit data. Each time a sub-decision or rule is added or edited, the decision model editor sends a new command to be added to the command stack of the Decision Model's current draft in TCS. The OIS Decision Model may be further edited to add calls to analytic models to determine the probability of a given up-sell or cross-sell being successful. These probabilities are used in the business rules. In one embodiment of the present disclosure, if specific models are discovered/referenced, a traceability link may be created at this point with the Decision Model as the consumer and the analytic model as the producer. In one embodiment of the present disclosure, if there is only a description of what probability needs to be determined based on what set of variables, no link is created yet.

Corp. A's IT group then may update the OIS database (DB) schema to include the columns described in the text prose. The schema editor is TCS-enabled in one embodiment of the present disclosure, and as such each edit sends a command to TCS to be added to the current draft's command stack. After the editing is done, the user may designate it as a new draft.

Corp. A's IT group may also update OIS analytic library with new analytic models, for instance, which use the new columns to determine probabilities a customer will accept a given offer. In one embodiment of the present disclosure, each analytic model may be its own artifact, and the analytic library may be a composite artifact, possibly a binary created from a set of analytic models. Edits to models create commands on the command stacks of their drafts, and builds (creating or adding to) of the library also create a new draft of the library in one embodiment of the present disclosure.

Corp. A's IT group may also connect the decision model's analytic references to the new analytic models. This is achieved via edits to the decision model, which may create new commands on the command stack of the decision model artifact, and which may create a new draft as well.

OIS is updated with the executable Decision Model, analytic models, new DB schema, and thus begins to use the data gathered by the rootkit to identify new opportunities. If the build system is TCS-enabled, new builds are considered as new drafts of the application/service binary and the addition/ updating of sources that the binary is built from are considered as commands.

At a later point, the OIS team leader (e.g., person A) decides to rephrase some of the business level text prose in the document that describes the functionality of this new OIS feature. In response, the TCS-enabled text editor (which person A uses to rephrase the text prose) sends commands and drafts to TCS. After editing the prose, person A uses traceability links between the prose, Decision Model, business vocabulary, database columns, and analytic model variable names to quickly find and change any phraseology or names which may also need to be rephrased. For instance, person A may use an affordance (such as a tree) to view the graph of artifacts that are connected to the document via traceability links and navigates via the links to the precise location in those artifacts that use the language/names that he has changed in the document. In one embodiment of the present disclosure, each artifact opens in its respective TCS-enabled editor. Person A edits the artifacts, thus creating a series of commands and eventually new drafts of each artifact, and deploys/disseminates the new drafts as appropriate.

In the event that Corp. A decides to remove the rootkit, and go back to the OIS decision model before the rootkit was integrated into it, TCS and TCS-enabled systems and tools may be used, by selecting the draft of the OIS Decision Model from the day before person A's changes and setting it as the temporal reference point. In this way, Corp. A is able to instantly identify the drafts of the OIS decision model, OIS build, analytic library, and DB schema that predated changes relevant to person A's idea, rebuild OIS without any of the rootkit features. In one embodiment of the present disclosure an affordance (such as a timeline) may be used to navigate to the draft of the OIS Decision Model which existed before person A's changes and to set that draft of the decision model as the temporal reference point. TCS tool or user interface elements such as buttons on a toolbar may be used to perform such actions. Another affordance (such as a tree) may be used to select all the artifacts that have traceability links to/from the Decision Model, rolls them all back to the temporal reference point, and rebuild and redeploys OIS.

With the system and methodology of the present disclosure, one may back out from a course of action taken on an artifact. Corresponding undo actions may be performed on different artifacts (e.g., two word processing documents, three spreadsheet documents, and a wiki) in for example one shot by rolling an artifact universe back to a previous time. The traceability links of artifacts also maintain the history of correlations and existence of source-target relationships, for instance, when draft x of artifact y was created at time z. Interrelated artifacts may be tracked at a given temporal reference point. The system and methodology of the present disclosure also provide the ability of the user to shift the entire artifact universe to its state at a given temporal reference point.

Known versioning systems are strictly hierarchical in their grouping of artifacts together into a tag/version/snapshot; the ability to interactively view and manipulate all artifacts at a temporal reference point, without having to create a tag/ version/snapshot across an entire encompassing hierarchy, does not exist. The ability to navigate between connected artifacts and view their states at the time of connection without having to create a tag/version/snapshot across an entire encompassing hierarchy, does not exist.

The system of the present disclosure in one embodiment may work well when a set of artifacts are co-located in one system or are distributed in disparate systems. For example, the system may be used as a DVCS (Distributed Version Control System). The system of the present disclosure in one embodiment solves a check-pointing problem for distributed compensation or roll-back. The system of the present disclosure in one embodiment provides a time machine for debugging parallel/multi-threaded applications, provides an undo function for time. The system of the present disclosure in one embodiment enables a user to move through an artifact universe across-time, for example, based on temporal reference points. The system and methodology of the present disclosure in one embodiment may be employed in conjunction with existing versioning or like systems.

Figure 7:
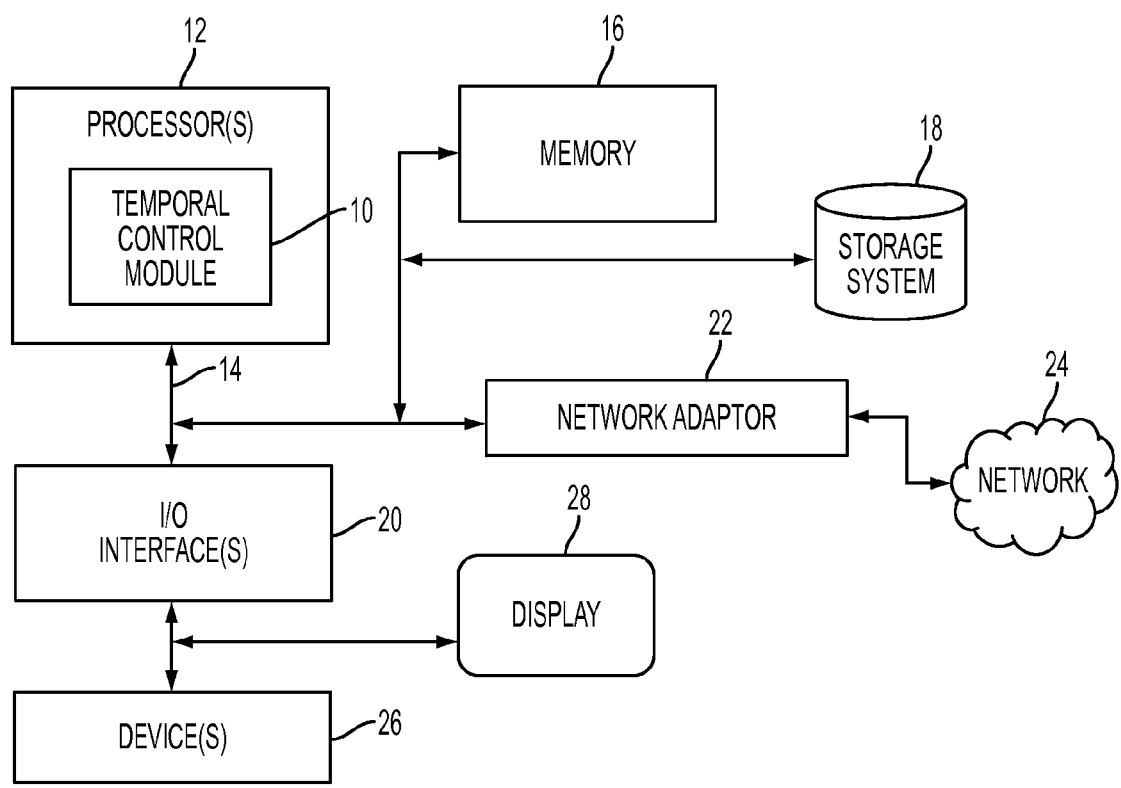
FIG. 7 illustrates a schematic of an example computer or processing system that may implement the temporal control system in one embodiment of the present disclosure.

FIG. 7 illustrates a schematic of an example computer or processing system that may implement the temporal control system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a temporal control module 10 that performs temporal control service methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system to view and manipulate artifacts at a temporal reference point, comprising:
   one or more artifact drafts associated with each of a plurality of artifacts, each of said one or more artifact drafts representing a state of the associated artifact at a point in time and one or more commands in a command stack that transformed said each artifact draft's parent into said each artifact draft;
   a plurality of traceability links and traceability vertices representing connections between said one or more artifact drafts of the plurality of artifacts, wherein a traceability link includes an edge between an artifact draft of an artifact in the plurality of artifacts and an artifact draft of another artifact in the plurality of artifacts, said artifact draft of an artifact in the plurality of artifacts and the artifact draft of another artifact in the plurality of artifacts forming the traceability vertices, the traceability link created at least in response to automatically detecting an action performed within one artifact that automatically accesses said another artifact, without a user explicitly accessing said another artifact wherein said another artifact is automatically identified, wherein the traceability link comprises an indication at said one artifact as a consumer and a first link pointing to an offset and length in said one artifact's content where the action occurred, and an indication at said another artifact as a producer and a second link pointing to an offset and length of said another artifact's content that is accessed;

a processor; and a module operable to execute on the processor and navigate through said one or more artifacts of the plurality of artifacts from a reference temporal point via the plurality of traceability links, wherein the module is further operable to navigate across said one or more artifact drafts of different artifacts via the traceability links in response to an artifact draft being selected, wherein the artifact draft is selectable by point in time, wherein viewing the artifact draft that is selected enables viewing of all artifacts connected to the artifact draft that is selected in said all artifacts' states as said all artifacts' states were at points in time at which respective connection to the artifact draft that is selected was created, wherein the artifact and said another artifact are different application program documents.

2. The system of claim 1, further including a server that stores said one or more artifact drafts and said plurality of traceability links and traceability vertices.

3. The system of claim 1, wherein the module is further operable to create said one or more artifact drafts and said plurality of traceability links and traceability vertices.

4. The system of claim 1, wherein said traceability links and traceability vertices are created automatically in response to an action being performed on said artifact draft of an artifact in the plurality of artifacts that accesses said artifact draft of another artifact in the plurality of artifacts.

5. The system of claim 1, wherein the module includes a user interface that enables a user to select said temporal reference point and present views of said artifact drafts.

6. The system of claim 5, wherein the module further presents said artifact drafts navigated starting from said temporal reference point via the user interface.

7. The system of claim 1, wherein the module is further operable to modify said one or more artifact drafts based on received commands.

8. The system of claim 1, wherein the module further includes an application interface via which one or more commands are received for manipulating said one or more artifact drafts.

9. The system of claim 1, wherein the module is further operable to create a new branch of artifact draft by creating a new artifact draft from an artifact draft that is not a most recent draft, wherein a starting state of the new branch of an artifact draft is an artifact's state in a draft from which the new branch is created.

10. The system of claim 1, wherein said one artifact comprises an executable logic being authored with an authoring tool and said another artifact comprises an ontology employed by the authoring tool, the ontology that defines a word entered into the authoring tool in authoring the executable logic.

11. A computer readable storage medium storing a program of instructions executable by a machine to perform a method to view and manipulate artifacts at a temporal reference point, comprising:

receiving a command that edits a first artifact;

adding a time stamp to the command;

storing the command in a command stack;

storing a current state of the first artifact and the command stack as an artifact draft, wherein the first artifact has a plurality of artifact drafts associated with the first artifact; and in response to detecting that the command comprises an action performed from the first artifact that accesses a second artifact, creating a traceability link between said artifact draft and a second artifact draft associated with said second artifact, wherein the traceability link comprises an indication at the first artifact as a consumer and a first link pointing to an offset and length in the artifact draft's content where the action occurred, and an indication at the second artifact as a producer and a second link pointing to an offset and length of the second artifact's content that is accessed, the second artifact draft corresponding to the second's artifact current state as of a time of the action performed in the first artifact that accesses the second artifact, wherein the action that accesses the second artifact responsive to which the traceability link is created comprises at least an automated action that is not an explicit user action on the second artifact wherein the second artifact is automatically identified, the artifact draft and the second artifact draft forming traceability vertices, the second artifact having a plurality of second artifact drafts associated with the second artifact, wherein a user is enabled to traverse an artifact draft graph comprising said traceability vertices, wherein viewing a state of the first artifact enables the user to view all artifacts connected to the first artifact in their state as they were at points in time at which respective connection to the state of the first artifact was created, wherein the artifact draft represents the current state of the first artifact at a point-in-time corresponding to the time stamp, and the command stack comprises one or more commands issued since initial creation of the artifact draft to the current state, wherein the artifact draft is editable until it is sealed and becomes a complete draft, and wherein a new child draft can be created based on the artifact draft that becomes complete, wherein the artifact drafts are selectable by point in time, wherein the first artifact and the second artifact are different application program documents.

12. The computer readable storage medium of claim 11, further including assigning the current state of the first artifact as a new artifact draft.

13. The computer readable storage medium of claim 11, wherein the steps are repeated for a plurality of artifacts, and wherein a plurality of artifact drafts and associated plurality of traceability links are generated for each of said plurality of artifacts.

14. The computer readable storage medium of claim 13, further including:

receiving a selected artifact draft, the selected artifact draft representing a temporal reference point;

searching the traceability links and traceability vertices to find one or more other artifact drafts linked to the selected artifact draft; and presenting the selected artifact draft and said one or more other artifact drafts as of the same temporal reference point, if said one or more other artifact drafts exist.

15. The computer readable storage medium of claim 14, further including:

if said one or more other artifact drafts do not have time stamps corresponding to said temporal reference point, selecting a command point from a command stack associated with said one or more other artifact drafts, that has a time stamp that is closest to the temporal reference point;

rewinding or replaying one or more commands in the command stack from said command point to generate a state of said one or more other artifacts; and presenting the generated state of said one or more other artifacts.

16. The computer readable storage medium of claim 13, further including:

receiving a point in the command stack between two artifact drafts, the point in the command stack representing a temporal reference point;

choosing an artifact draft from the two artifact drafts that is closest temporally to the point in the command stack;

searching the traceability link and traceability vertices to find one or more other artifact drafts linked to the chosen artifact draft;

if said one or more other artifact drafts have time stamp corresponding to said temporal reference point, presenting said one or more other artifact drafts; and if said one or more other artifact drafts do not have time stamp corresponding to said temporal reference point, selecting a command point from a command stack associated with said one or more other artifact drafts, that has a time stamp that is closest to the temporal reference point;

rewinding or replaying one or more commands in the command stack from said command point to generate a state of said one or more other artifacts that is related to said point in the command stack between two artifact drafts; and presenting the generated state of said one or more other artifacts.

17. The computer readable storage medium of claim 13, further including:

editing an artifact draft that is not a most recent artifact draft associated with an artifact; and creating a new branch of artifact draft starting from the edited artifact draft.

18. The computer readable storage medium of claim 11, wherein said first artifact comprises an executable logic being authored with an authoring tool and said second artifact comprises an ontology employed by the authoring tool, the ontology that defines a word entered into the authoring tool in authoring the executable logic.

* * * * *